(12) United States Patent
Han et al.

(10) Patent No.: US 9,129,465 B2
(45) Date of Patent: Sep. 8, 2015

(54) MEDIUM SENSING APPARATUS, MEDIUM HANDLING APPARATUS AND FINANCIAL DEVICE

(71) Applicant: LG CNS CO., LTD., Seoul (KR)

(72) Inventors: Ji Hoon Han, Seoul (KR); Bok Nam Jeong, Seoul (KR)

(73) Assignee: LG CNS CO., LTD., Seoul (KR)

( * ) Notice: Subject to any disclaimer, the term of this patent is extended or adjusted under 35 U.S.C. 154(b) by 0 days.

(21) Appl. No.: 13/895,998

(22) Filed: May 16, 2013

(65) Prior Publication Data

US 2013/0311366 A1 Nov. 21, 2013

(30) Foreign Application Priority Data

May 16, 2012 (KR) ........................ 10-2012-0052052

(51) Int. Cl.
*G06Q 40/00* (2012.01)
*G07F 19/00* (2006.01)
*G06Q 20/10* (2012.01)

(52) U.S. Cl.
CPC ............ *G07F 19/20* (2013.01); *G06Q 20/1085* (2013.01); *G07F 19/205* (2013.01)

(58) Field of Classification Search
CPC ...................................................... G07F 19/20
USPC ......................................................... 705/43
See application file for complete search history.

(56) References Cited

U.S. PATENT DOCUMENTS

2002/0129257 A1* 9/2002 Parmelee et al. ............. 713/180

FOREIGN PATENT DOCUMENTS

| CN | 1190225 A | 8/1998 |
| CN | 1904950 A | 1/2007 |
| CN | 101589411 A | 11/2009 |
| JP | 2007-94807 A | 4/2007 |
| KR | 10-2007-0017773 A | 2/2007 |
| KR | 10-2009-0047870 A | 5/2009 |
| KR | 10-1076323 B1 | 10/2011 |

OTHER PUBLICATIONS

Targeted News Service "U.S. Patents Awarded to Inventors in Pennsylvania"; Washington, D.C. Jun. 4, 2012.*
Notice of Allowance dated Aug. 27, 2013 in Korean Application No. 10-2012-0052052, filed May 16, 2012.
Office Action dated Jan. 7, 2015 in Chinese Application No. 201310166675.9.

* cited by examiner

*Primary Examiner* — Edward Chang
(74) *Attorney, Agent, or Firm* — Saliwanchik, Lloyd & Eisenschenk

(57) ABSTRACT

Provided is a medium sensing apparatus. The medium sensing apparatus comprises a first frame having a hole in a side surface thereof, a second frame coupled to the first frame, a first sensor mounted on the first frame, a bracket connected to the first sensor, the bracket contacting the second frame, and a shaft disposed on the first sensor or the bracket to pass through the hole, the shaft being movable within the hole.

17 Claims, 5 Drawing Sheets

MEDIUM SENSING APPARATUS, MEDIUM HANDLING APPARATUS AND FINANCIAL DEVICE

CROSS-REFERENCE TO RELATED APPLICATION

This application claims the benefit under 35 U.S.C. §119 of Korean Patent Application No. 10-2012-0052052, filed May 16, 2012, which is hereby incorporated by reference in its entirety.

BACKGROUND

The present disclosure relates to a medium sensing apparatus, a medium handling apparatus, and a financial device.

In general, financial devices are devices for automatically performing financial business desired by user s. The financial devices may deposit or withdraw media (for example, paper moneys, checks, securities, gift certificates, and the like) or automatically transfer the media.

Such a financial device comprises a medium handling device for inputting or outputting a medium and a medium storage part for storing the medium. The medium deposited through the medium handling device may be stored in the medium storage part, and the medium stored in the medium storage part may be withdrawn through the medium handling device.

In general, various advanced technologies are being applied to the medium to prevent the medium from being forged or falsified. To prevent the forged or falsified medium from being transacted in a financial device, a medium sensing apparatus may be provided in the financial device. Also, the medium sensing apparatus may comprise various sensors such as a contact image sensor (hereinafter, referred to as a CIS) sensing a shape of the medium and an image of the medium using special ink or a magneto resistive sensor (hereinafter, referred to as an MR sensor) sensing a magnetic material contained in the medium.

The medium sensing apparatus may have an opened structure to maintain and repair components such as the sensors provided in the medium sensing apparatus. For example, the medium sensing apparatus comprises an upper frame and a lower frame which are coupled to each other. Also, the sensors are installed within the upper and lower frames which are coupled to each other. In a case where it is needed to repair the sensors, the upper and lower frames may be separated from each other.

When the upper and lower frames are coupled again to each other after the medium sensing apparatus is opened to repair the sensors, an arrangement of the sensors may be changed due to an assembly error of the components when compared to an original arrangement thereof. That is, a vertical distance between the sensors provided within the coupled upper and lower frames may not be constantly maintained. In this case, it may be difficult to precisely sense the medium through the sensors. Particularly, in a case of the CIS, when a distance between the sensors is not constantly maintained, it may be difficult to precisely sense the medium. Thus, the constant distance maintenance between the sensors may be very important for precisely sensing the medium.

In the medium sensing apparatus according to the related art, the sensors are fixed to the upper or lower frame. Thus, after the medium sensing apparatus is repaired, and then the upper and lower frames are assembled again with each other, whether a distance between the sensors is adequately maintained should be confirmed while confirming an image of a medium obtained by passing through the medium sensing apparatus. This situation may equally occur when the medium sensing apparatus is initially assembled. In this case, it may be difficult to constantly maintain the distance between the sensors when the medium sensing apparatus is assembled. Thus, the product may be deteriorated in quality, and also, a time required for assembling the medium sensing apparatus may increase.

BRIEF SUMMARY

Embodiments provide a medium sensing apparatus, a medium handling apparatus, and a financial device.

In one embodiment, a medium sensing apparatus comprises: a first frame having a hole in a side surface thereof a second frame coupled to the first frame; a first sensor mounted on the first frame; a bracket connected to the first sensor, the bracket contacting the second frame; and a shaft disposed on the first sensor or the bracket to pass through the hole, the shaft being movable within the hole.

In another embodiment, a medium handling apparatus comprises: a medium handling part through which a medium is deposited or withdrawn; and a medium sensing apparatus that senses the deposited or withdrawn medium, wherein the medium sensing apparatus comprises: a first frame; a first sensor movably disposed on the first frame; a bracket mounted on the first frame, the bracket being movable together with the first sensor; and a second frame on which a second sensor corresponding to the first sensor is mounted, wherein one surface of the bracket contacts one surface of the second frame to constantly maintain a distance between the first sensor and the second sensor.

In further another embodiment, a financial device comprises: an user information acquisition part that acquires information of an user; an user interface that displays a menu and information for depositing or withdrawing, the user interface inputting or selecting a command or information for depositing or withdrawing; and a medium sensing apparatus that senses a medium to be deposited or withdrawn, wherein the medium sensing apparatus comprises: a first frame; a first sensor movably disposed on the first frame; a bracket connected to the first sensor to move together with the first sensor; and a second frame on which a second sensor corresponding to the first sensor is mounted, the second frame providing a medium transfer path together with the first frame, wherein, when the first frame and the second frame are coupled to each other, the bracket contacts the second frame to space the first and second sensors from each other.

The details of one or more embodiments are set forth in the accompanying drawings and the description below. Other features will be apparent from the description and drawings, and from the claims.

DETAILED DESCRIPTION

Figure 1:
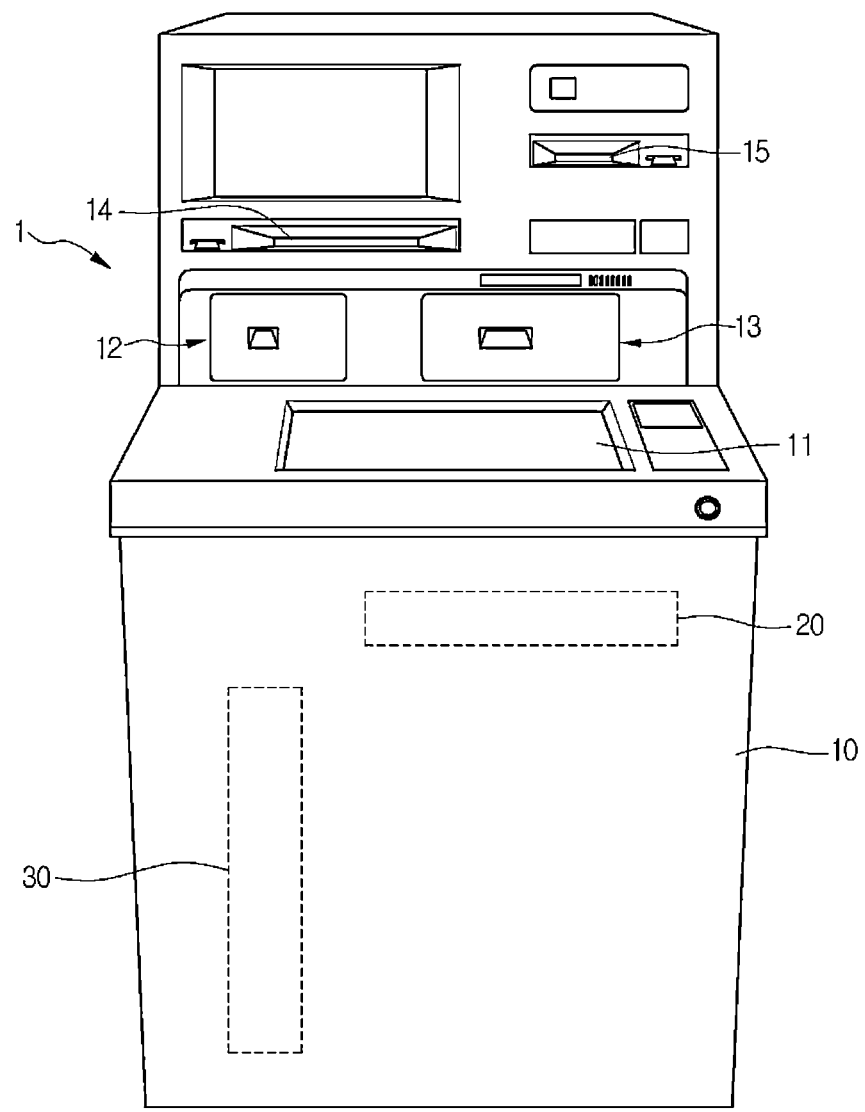
FIG. 1 is a perspective view of a financial device according to an embodiment.

Hereinafter, exemplary embodiments of the present disclosure will be described with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

A financial device according to embodiments is a device that performs financial businesses, i.e., medium processing comprising processing such as deposit processing, giro receipt, or gift certificate exchange and/or processing such as withdrawal processing, giro dispensing, or gift certificate dispensing by receiving various media such as, e.g., paper moneys, bills, giros, coins, gift certificates, etc. For example, the financial device may comprise an automatic teller machine (ATM) such as a cash dispenser (CD) or a cash recycling device. However, the financial device is not limited to the above-described examples. For example, the financial device may be a device for automatically performing the financial businesses such as a financial information system (FIS).

Hereinafter, assuming that the financial device is the ATM, an embodiment will be described. However, this assumption is merely for convenience of description, and technical idea of the present disclosure is not limited to the ATM.

FIG. 1 is a perspective view of a financial device according to an embodiment.

Referring to FIG. 1, a financial device 1 according to an embodiment comprises a main body 10 in which a plurality of components are received. The main body 10 may comprise medium handling parts 12 and 13 for depositing or withdrawing a medium and at least one medium storage box 30 for storing the medium. The at least one medium storage box 30 may be separably mounted on the main body 10.

Also, according to a kind of financial device 1, the financial device 1 may further comprise a bankbook handling part 14 for depositing or withdrawing a bankbook and a card handling part 15 for depositing or withdrawing an integrated circuit (IC) card.

The bankbook handling part 14 or the card handling part 15 may be called a user information acquisition part for acquiring user's information. This specification is not limited to a kind of user information acquisition part. For example, the user's information may be acquired by using information recorded in an RFID tag or USB or a user's fingerprint.

Also, the financial device 1 may further comprise a user interface 11 displaying a menu or information for depositing or withdrawing and inputting or selecting a command or information for depositing or withdrawing.

A well-known structure may be used as a basic structure of the financial device 1, and thus its detailed description will be omitted. Hereinafter, the medium sensing apparatus that is a main concern in the current embodiment and the financial device using the same will be described.

Figure 2:
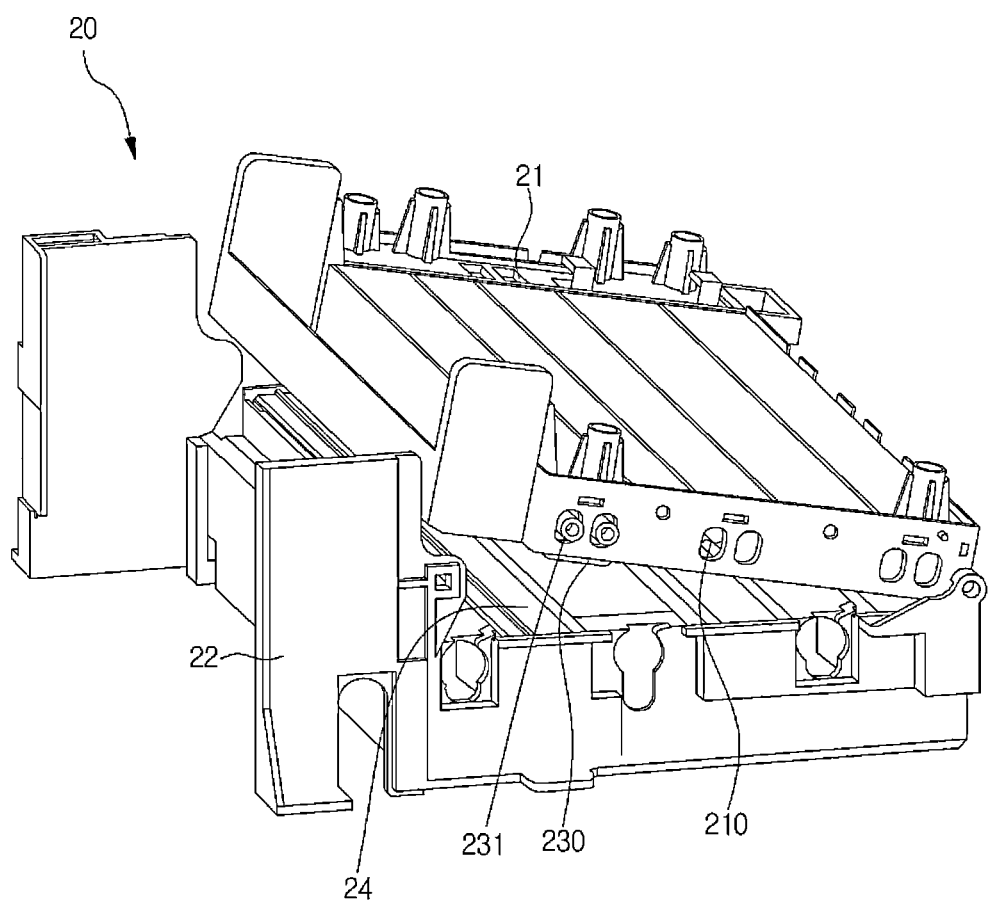
FIG. 2 is a perspective view of a medium sensing apparatus according to an embodiment.

FIG. 2 is a perspective view of the medium sensing apparatus according to an embodiment.

Referring to FIG. 2, the medium sensing apparatus 20 according to an embodiment comprises a frame and a sensor. The frame comprises an upper frame 21 and a lower frame 22. The sensor comprises a first sensor 23 disposed on the upper frame 21 and a second sensor 24 disposed on the lower frame 22. The upper and lower frames 21 and 22 may be separably coupled to each other. Alternatively, the upper frame 21 may be rotatably coupled to the lower frame 22.

A hole 210 defined lengthily in a vertical direction is defined in a side surface of the upper frame 21. A shaft 231 connected to the first sensor 23 may pass through the hole 210. Here, the hole 210 may be defined in an oblong shape so that the shaft 231 is movable in a state where the shaft 231 passes through the hole 210.

One of the first sensor 23 or the second sensor 24 may be fixed to the frames 21 and 22 to prevent the one sensor from being movable in a state where the one sensor is mounted on the frames 21 and 22. For example, the second sensor 24 may be fixed to the lower frame 22. Hereinafter, a structure in which it is assumed that the second sensor 24 mounted on the lower frame 22 is fixed to the lower frame 22 will be described.

Figure 3:
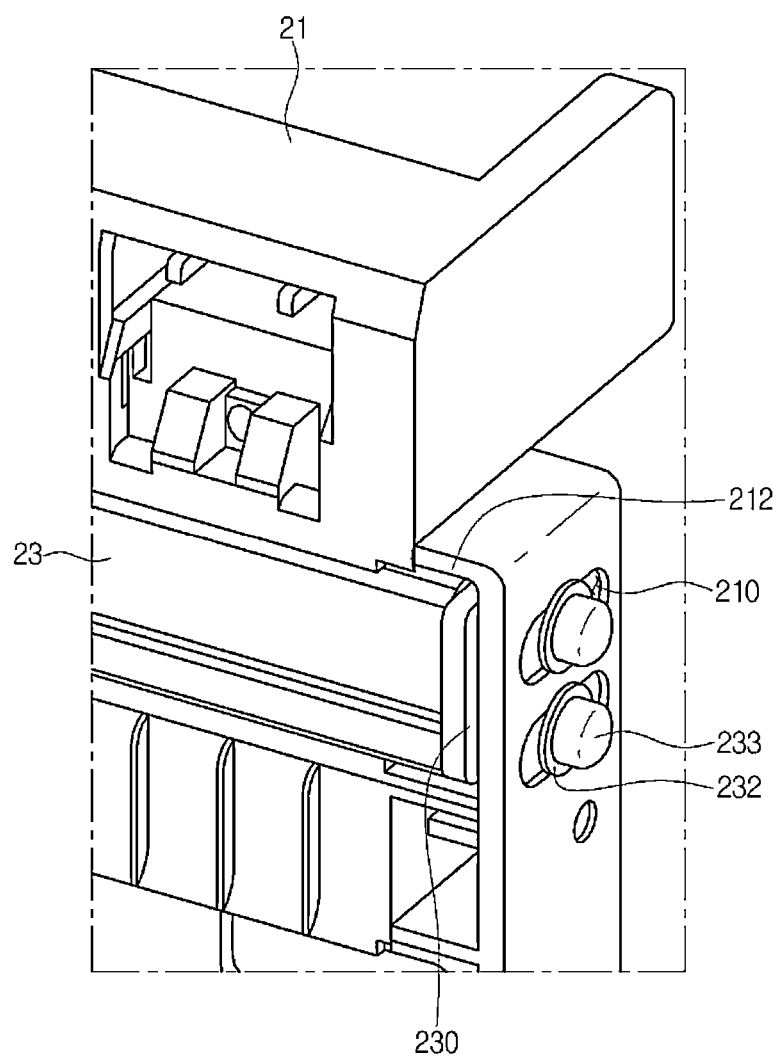
FIG. 3 is a view illustrating a portion of the medium sensing apparatus according to an embodiment.

FIG. 3 is a view illustrating a portion of the medium sensing apparatus according to an embodiment.

Referring to FIGS. 2 and 3, a bracket 230 may be disposed between the first sensor 23 and an inner surface of the upper frame 21. The shaft 231 connected to the first sensor 23 may successively pass through a hole (not shown) defined in the bracket 230 and the hole 210 defined in the upper frame 21. Thus, the bracket 230 may be mounted on the first sensor 23. The bracket 230 may extend longer than a lower surface of the upper frame 21 to protrude to the outside of the upper frame 21. That is, a receiving part 212 for receiving the first sensor 22 and the bracket 230 is received in the upper frame 22. A protruding height of the bracket 230 is greater than that of the first sensor 22 in a state where the first sensor 22 is received in the receiving part 212. The bracket 230 is coupled to the first sensor 23 to be movable together with the first sensor 23.

Although the bracket 230 is received in the receiving part 212 as described above, the present disclosure is not limited thereto. For example, the bracket 230 may be connected to the shaft of the first sensor 23 at the outside of the upper frame 21. In this case, the bracket 230 should be connected to the first sensor 23 to vertically move together with the first sensor 23. Also, a lower end of the bracket 230 should be capable of contacting a top surface of the lower frame 22.

A bushing 232 may be fitted into the shaft 231 from the outside of the upper frame 21. A coupling member 233 is coupled to the shaft 231 in the state where the bushing 232 is fitted into the shaft 231. Here, the bushing 232 may have an outer diameter greater than that of the shaft 231 so that the bushing 232 does not pass through the hole 210 in the state where the bushing 232 is fitted into the shaft 231. That is, a portion of a surface of the bushing 232 may contact an outer surface of the upper frame 21. Thus, the first sensor 21 and the bracket 230 may be mounted on the upper frame 21 to vertically move along the hole 210.

The bracket 230 may be coupled to the shaft 231 exposed to the outside of the upper frame 21. However, in this case, the bracket 230 should be connected to the first sensor 23 to vertically move together with the first sensor 23. Also, the lower end of the bracket 230 should be provided to contact the top surface of the lower frame 22.

Figure 4:
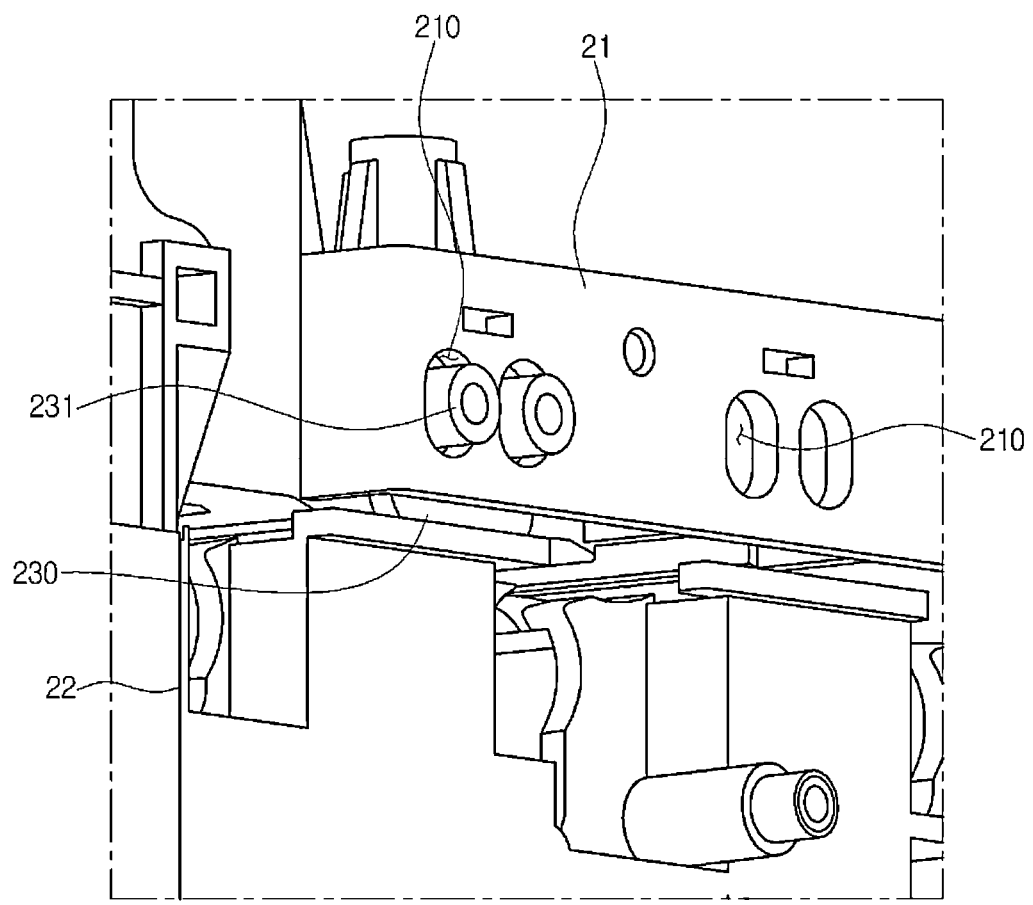
FIG. 4 is a view of a state in which the medium sensing apparatus is coupled according to an embodiment.

FIG. 4 is a view of a state in which the medium sensing apparatus is coupled according to an embodiment.

FIG. 4 illustrates the medium sensing apparatus in which the bushing 232 and the coupling member 233 are moved.

Referring to FIG. 4, a medium transfer path is defined between the upper frame 21 and the lower frame 22. Also, the bracket 230 and the first sensor 23 may move in a direction crossing the medium transfer path in the upper frame 21.

When the upper frame 21 and the lower frame 22 are coupled to each other, the lower end of the bracket 230 contacts the top surface of the lower frame 22. When the medium sensing apparatus 20 is assembled, a constant distance exists between the upper frame 21 and the lower frame 22. Even though the distance between the frames 21 and 22 does not be constantly maintained, the first sensor 23 may be maintained always at a constant distance with respect to the second sensor 24. That is, the first sensor 23 may be maintained to be spaced always from the lower frame 22 by a vertical length of the bracket 230. Also, since the second sensor 24 is fixedly mounted on the lower frame 22, the distance between the first sensor 23 and the second sensor 24 may be constantly maintained always.

Figure 5:
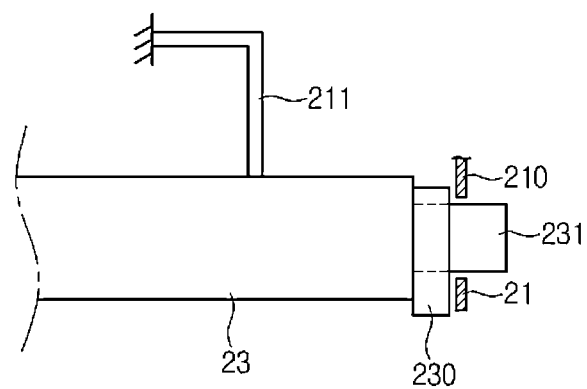
FIG. 5 is a view illustrating a portion of a sensing part of the medium sensing apparatus according to an embodiment.

FIG. 5 is a view illustrating a portion of a sensing part of the medium sensing apparatus according to an embodiment.

Referring to FIG. 5, the medium sensing apparatus 20 may further comprise an elastic member 211. The elastic member 211 may be mounted on the upper frame 21. The elastic member 211 may provide an elastic force to the first sensor 23 or the bracket 230 to push the first sensor 23 and the bracket 230 toward the lower frame 22. Thus, when the upper frame 21 and the lower frame 22 are coupled to each other, the bracket 230 may reliably contact the lower frame 22. Also, the constant distance between the first sensor 23 and the second sensor 24 may be more precisely maintained. Also, when the frame is assembled, it may prevent the sensor disposed on the upper frame and the sensor disposed on the lower frame from being bumped to each other and thus damaged.

Figure 6:
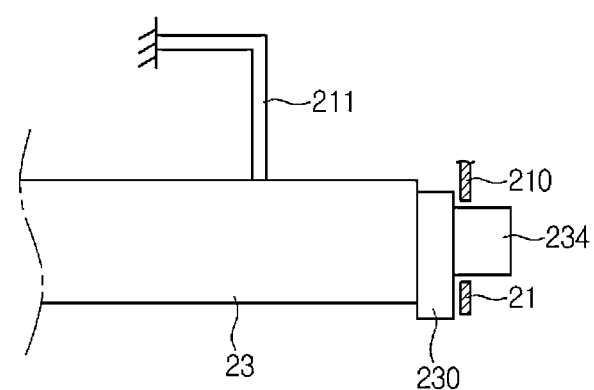
FIG. 6 is a view illustrating a portion of a medium sensing apparatus according to another embodiment.

FIG. 6 is a view illustrating a portion of a medium sensing apparatus according to another embodiment.

Referring to FIG. 6, a shaft may not be disposed on a first sensor 22, and a shaft 234 may be disposed on the bracket 230. Also, the shaft 234 of the bracket 230 may pass through a hole 210. In this case, the bracket 230 may should be coupled to the first sensor 23 to move together with the first sensor 23.

Although the two frames are vertically disposed in the above-described embodiment, the present disclosure is not limited thereto. For example, the two frames may be horizontally disposed. Thus, in the current embodiment, the two frames may be called to a first frame and a second frame, respectively.

Even though all the elements of the embodiments are coupled into one or operated in the combined state, the present disclosure is not limited to such an embodiment. That is, all the elements may be selectively combined with each other without departing the scope of the invention. Furthermore, when it is described that one comprises (or comprises or has) some elements, it should be understood that it may comprise (or comprise or has) only those elements, or it may comprise (or comprise or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

What is claimed is:

1. A medium sensing apparatus comprising:
    a first frame having a hole in a side surface thereof and a receiving part;
    a second frame removably or rotatably coupled to the first frame;
    a first sensor received in the receiving part of the first frame;
    a bracket connected to the first sensor, the bracket contacting the second frame to be spaced between the first sensor and the second frame when the first frame is coupled to the second frame; and
    a shaft disposed on the first sensor or the bracket to pass through the hole, the shaft being movable within the hole.

2. The medium sensing apparatus of claim 1, further comprising a second sensor fixed to the second frame.

3. The medium sensing apparatus of claim 1, wherein the hole is defined in an oblong shape so that the shaft is movable.

4. The medium sensing apparatus of claim 1, wherein the shaft is disposed on the first sensor and passes through the hole after passing through the bracket.

5. The medium sensing apparatus of claim 1, wherein the shaft is disposed on the first sensor,
    the bracket is disposed outside the first frame, and
    the shaft passes through the bracket after passing through the hole.

6. The medium sensing apparatus of claim 1, wherein the bracket is received in the receiving part.

7. The medium sensing apparatus of claim 1, wherein a protruding height of the bracket is greater than that of the first sensor in the receiving part of the first frame.

8. The medium sensing apparatus of claim 1, further comprising an elastic member applying a force pushing the bracket toward the second frame.

9. The medium sensing apparatus of claim 7, wherein the elastic member is disposed on the first frame.

10. The medium sensing apparatus of claim 7, wherein the elastic member contacts the first sensor or the bracket.

11. A medium handling apparatus comprising:
a medium handling part through which a medium is deposited or withdrawn; and
a medium sensing apparatus that senses the deposited or withdrawn medium,
wherein the medium sensing apparatus comprises:
a first frame having a receiving part;
a first sensor movably received in the receiving part of the first frame;
a bracket mounted on the first frame, the bracket being movable together with the first sensor; and
a second frame on which a second sensor corresponding to the first sensor is mounted,
wherein one surface of the bracket contacts one surface of the second frame to be spaced between the first sensor and the second sensor when the first frame is coupled to the second frame.

12. The medium handling apparatus of claim 11, wherein a transfer path of the medium is defined between the first frame and the second frame, and
the first sensor and the bracket move in a direction crossing the transfer path of the medium.

13. The medium handling apparatus of claim 11, further comprising an elastic member pushing the bracket toward the second frame.

14. The medium handling apparatus of claim 11, wherein the bracket is received in the receiving part.

15. The medium handling apparatus of claim 11, wherein the bracket is connected to the first sensor at an outside of the first frame by a shaft extended from the first sensor.

16. A financial device comprising:
an user information acquisition part that acquires information of a user;
an user interface that displays a menu and information for depositing or withdrawing, the user interface inputting or selecting a command or information for depositing or withdrawing; and
a medium sensing apparatus that senses a medium that is deposited or withdrawn,
wherein the medium sensing apparatus comprises:
a first frame having a receiving part;
a first sensor movably received in the receiving part of the first frame;
a bracket connected to the first sensor to move together with the first sensor; and
a second frame on which a second sensor corresponding to the first sensor is mounted, the second frame providing a medium transfer path together with the first frame,
wherein, when the first frame and the second frame are coupled to each other, the bracket contacts the second frame to space the first and second sensors from each other.

17. The financial device of claim 16, further comprising an elastic member that supports the bracket or the first sensor to allow the bracket to contact the second frame.

* * * * *